UNITED STATES PATENT OFFICE.

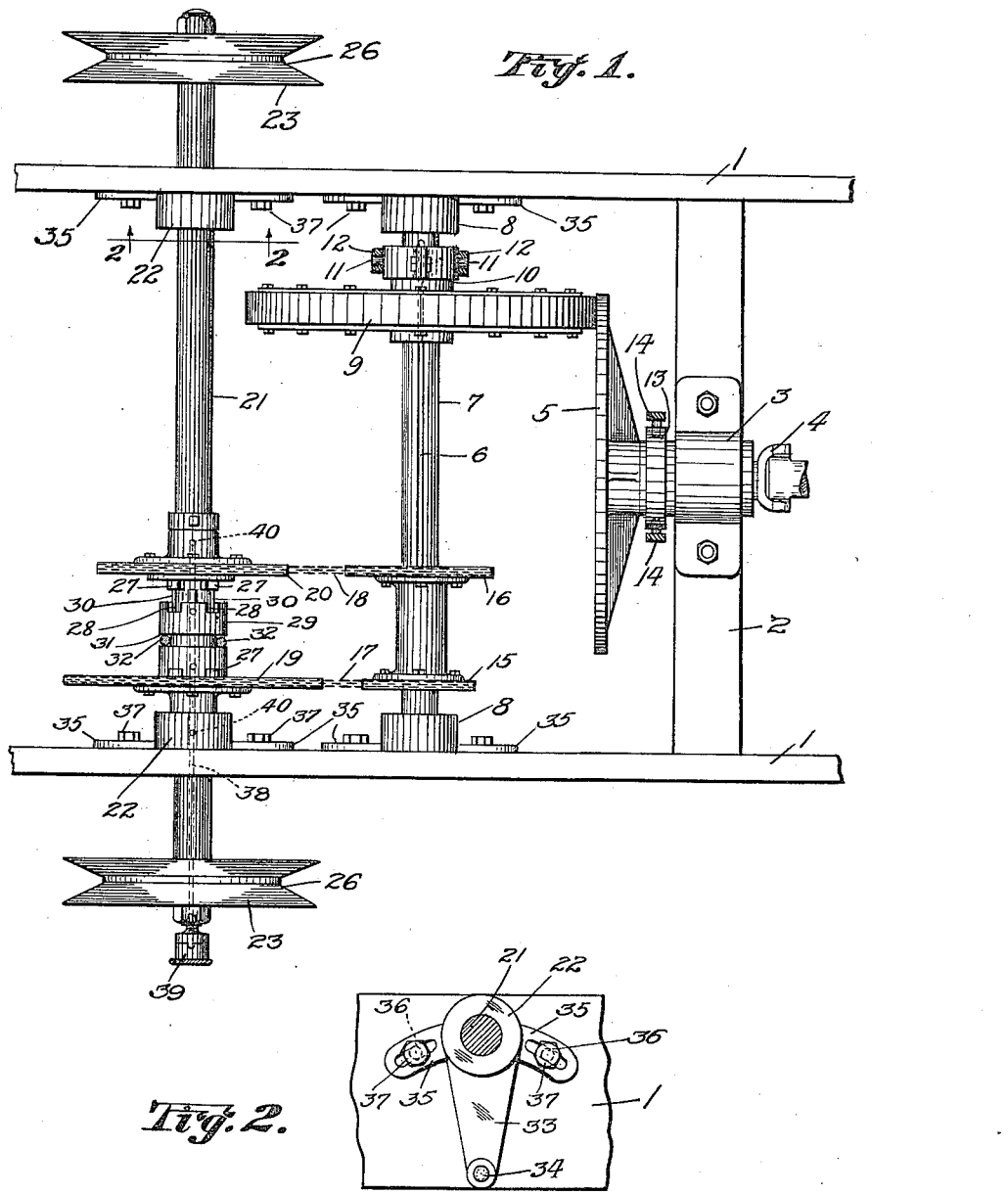

WILLIAM F. HUNT, OF SAN FRANCISCO, CALIFORNIA.

CHANGEABLE-SPEED GEARING.

1,143,048.   Specification of Letters Patent.   Patented June 15, 1915.

Application filed June 3, 1914. Serial No. 842,610.

*To all whom it may concern:*

Be it known that I, WILLIAM F. HUNT, a citizen of the United States, residing at the city and county of San Francisco and State of Califorina, have invented certain new and useful Improvements in Changeable-Speed Gearing, of which the following is a specification.

The present invention relates to improvements in changeable speed gearing and particularly to a type of gearing which is adapted for motor driven vehicles and one wherein the friction gear and chain and sprocket gears are combined thereby, attaining a greater range of speeds with as few elements than has been heretofore possible.

The invention has for its principal objects to provide a speed gearing whereby different speeds may be obtained and the machine reversed as occasion may require, to provide changeable speed gearing embodying a minimum number of coöperating elements which will be compact, effective, and adapted to be easily controlled and not liable to get out of order.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the appended claims may be resorted to without departing from the spirit or sacrificing any of the advantages of the invention.

To more fully comprehend the invention, reference is directed to the accompanying drawings, wherein the preferred form of my invention is disclosed and in which—

Figure 1 is a plan view disclosing the power shaft, the drive shaft, the friction connection between the power and drive shaft, the counter shaft and the chain and sprocket connection between the drive and counter shaft. Fig. 2 is a view in elevation, taken on line 2—2 of Fig. 1, disclosing one of the supporting hangers for the counter shaft.

Referring more particularly to the several views of the drawings, wherein like characters of reference designate similar parts throughout the several views—1 indicates the side members of a suitable supporting frame connected by the transverse member 2. Rotatably mounted in a bearing 3 carried by the member 2 is a power shaft 4 driven from any suitable source of power and carrying on its end a suitable friction disk 5. Slidably mounted to a key-way 6 formed in a driven shaft 7 rotatably mounted in bearings 8, in the frame 1, is a driven disk 9 which is normally in contact with the face of the disk 5 and carries on its hub a collar 10, provided with pins 11 which coöperate with the lower ends of a suitable shifting lever 12 which is of any suitable construction. A collar 13 is loosely mounted on the power shaft 4 between the bearing 3 and friction disk 5, and is operated to move the disk 5 relative to the disk 9 to increase or decrease the friction between the same by the lower ends 14 of a suitable operating lever.

Mounted to rotate with the drive shaft 4 and positioned thereon adjacent one end thereof, are the spaced sprocket wheels 15 and 16 of different diameters, and the same are connected by suitable chains 17 and 18 with sprockets 19 and 20, each of a different diameter and each of a diameter larger than the respective sprocket with which it is connected.

The sprockets 19 and 20 are rotatably mounted in spaced relation to each other on a counter shaft 21 which is rotatably mounted in bearings 22 carried by the side frame members 1, and the ends of said shaft which project beyond said side frame members carry suitable drive pulleys 23 formed with the peripheral V-shaped grooves 26 in which are adapted to operate suitable connections extending to the rear wheels.

The hub portions of the sprockets 19 and 20 are formed on adjacent faces with suitable outwardly projecting lugs or teeth 27, which are adapted to be received in suitable recesses 28 formed in the opposite end of a clutch dog 29 rotatable with the shaft 21 but slidably mounted thereon between the sprockets 19 and 20 on the splines 30. The clutch dog is formed with an annular groove 31 in which is received the end portions 32 of an operating lever.

The bearings 22 are capable of adjustment to move the shaft 21 relative to the shaft 7 to compensate for the expansion or contraction of the chains 17 and 18, and are formed with a depending supporting arm 33 pivotally connected by a bolt 34 to the frame, and are also formed with laterally extending slotted arms 35 through which extend the bolts 36 which extend through the frame and carry nuts 37. It will be apparent that by loosening the nuts 37, the bearings are capable of a slight arcuate movement. The counter shaft 21 is formed at one end with a centrally arranged longitudinally extending bore 38 adapted to be supplied with a lubricant from a grease cup 39 positioned in the end thereof, and said bore is formed at intervals with suitable lateral channels 40 which supply the respective working parts with lubricant.

From the above description, it will be apparent that I have provided a speed gearing which combines both the advantages of the friction gearing with that of the chain and sprocket, thereby obtaining a greater range of speeds, both forward and reverse. By mounting the clutch dog on the counter shaft, as in the drawings, the same is enabled to be easily shifted and is more quiet in its operation, owing to the reduced speed at which the counter shaft rotates.

Having thus described my invention what I claim and desire to protect by Letters Patent is:—

1. The combination with a supporting frame comprising oppositely disposed side bars and a transversely disposed supporting member between said side bars, of changeable speed gearing comprising a friction drive disk rotatably mounted in the transverse supporting member, a driven friction wheel engaging said driving disk, a pair of parallel shafts rotatably mounted between the side bars of the frame and disposed approximately parallel to the supporting cross member, an adjustable spline connection between the driven wheel and one of said shafts, means for shifting the driven wheel with reference to the driving disk, a pair of gears fixed to rotate with the shaft on which the driven wheel is mounted, a pair of alined gear wheels loosely mounted on the other shaft and operatively connected with said first mentioned pair of gears by chains, a clutch interposed between the loose gears and positively connected to the shaft on which it is sleeved, means for shifting the clutch to interlock one of the loose gears to its shaft, bodily movable bearings carrying the last mentioned shaft provided with adjusting instrumentalities to fasten the bearings in various positions to determine the degree of separation of the parallel shafts and correspondingly effect the chain connections, and similar bearings and adjustment for the other shaft to determine the position of the friction driven wheel with reference to the friction driving disk.

2. The combination with a supporting frame comprising oppositely disposed side bars and a transversely disposed supporting member between said side bars, of changeable speed gearing comprising a friction drive disk rotatably mounted in the transverse supporting member, a driven friction wheel engaging said driving disk, a pair of parallel shafts rotatably mounted between the side bars of the frame and disposed approximately parallel to the supporting cross member, an adjustable spline connection between the driven wheel and one of said shafts, means for shifting the driven wheel with reference to the driving disk, a pair of gears fixed to rotate with the shaft on which the driven wheel is mounted, a pair of alined gear wheels loosely mounted on the other shaft and operatively connected with said first mentioned pair of gears by chains, a clutch interposed between the loose gears and positively connected to the shaft on which it is sleeved, means for shifting the clutch to interlock one of the loose gears to its shaft, bodily movable bearings carrying the last mentioned shaft provided with adjusting instrumentalities to fasten the bearings in various positions to determine the degree of separation of the parallel shafts and correspondingly effect the chain connections, and shiftable adjustable bearings for the other shaft enabling the one to be adjusted with its driven wheel with reference to the driving disk and the other to be adjusted in keeping with said adjustment of the disk wheel carrying shaft.

3. The combination with a supporting frame, of changeable speed gearing comprising a driving member mounted on said frame, a driven member in engagement with the driving member, a pair of spaced parallel shafts mounted on the supporting frame, means for maintaining the driven member on one of said shafts, a driving connection between said parallel shafts, adjusting instrumentalities for maintaining the shaft of the driven member in different positions of adjustment with respect to the driving member and adjusting instrumentalities for maintaining the other shaft in various positions of adjustment to determine the degree of separation of the parallel shafts.

In testimony whereof I have signed my name to this specification in the presence of two subscribing witnesses.

WILLIAM F. HUNT.

Witnesses:
 HARRY A. TOTLER,
 D. B. RICHARDS.

Copies of this patent may be obtained for five cents each, by addressing the "Commissioner of Patents, Washington, D. C."